C. F. SPERY.
TIGHTENING MEANS FOR SILOS, TANKS, AND THE LIKE.
APPLICATION FILED MAY 17, 1913.
1,111,107.
Patented Sept. 22, 1914.
2 SHEETS—SHEET 2.
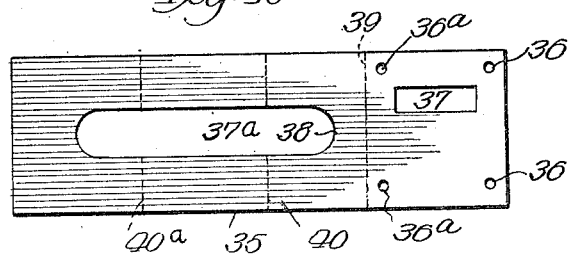
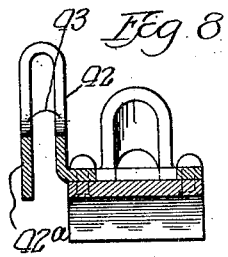
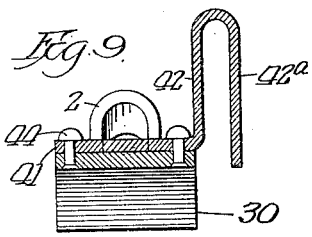
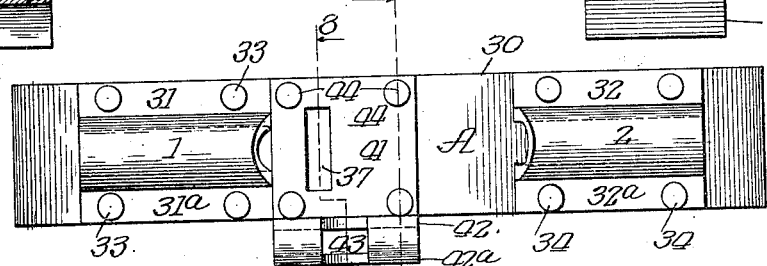
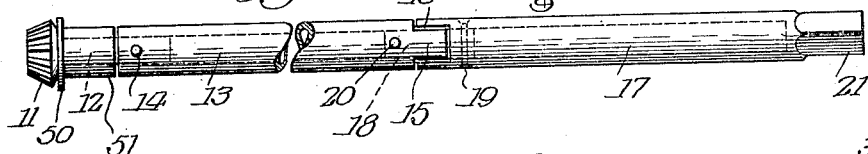
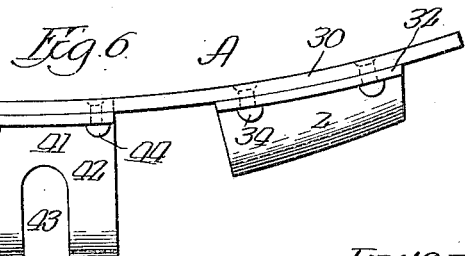

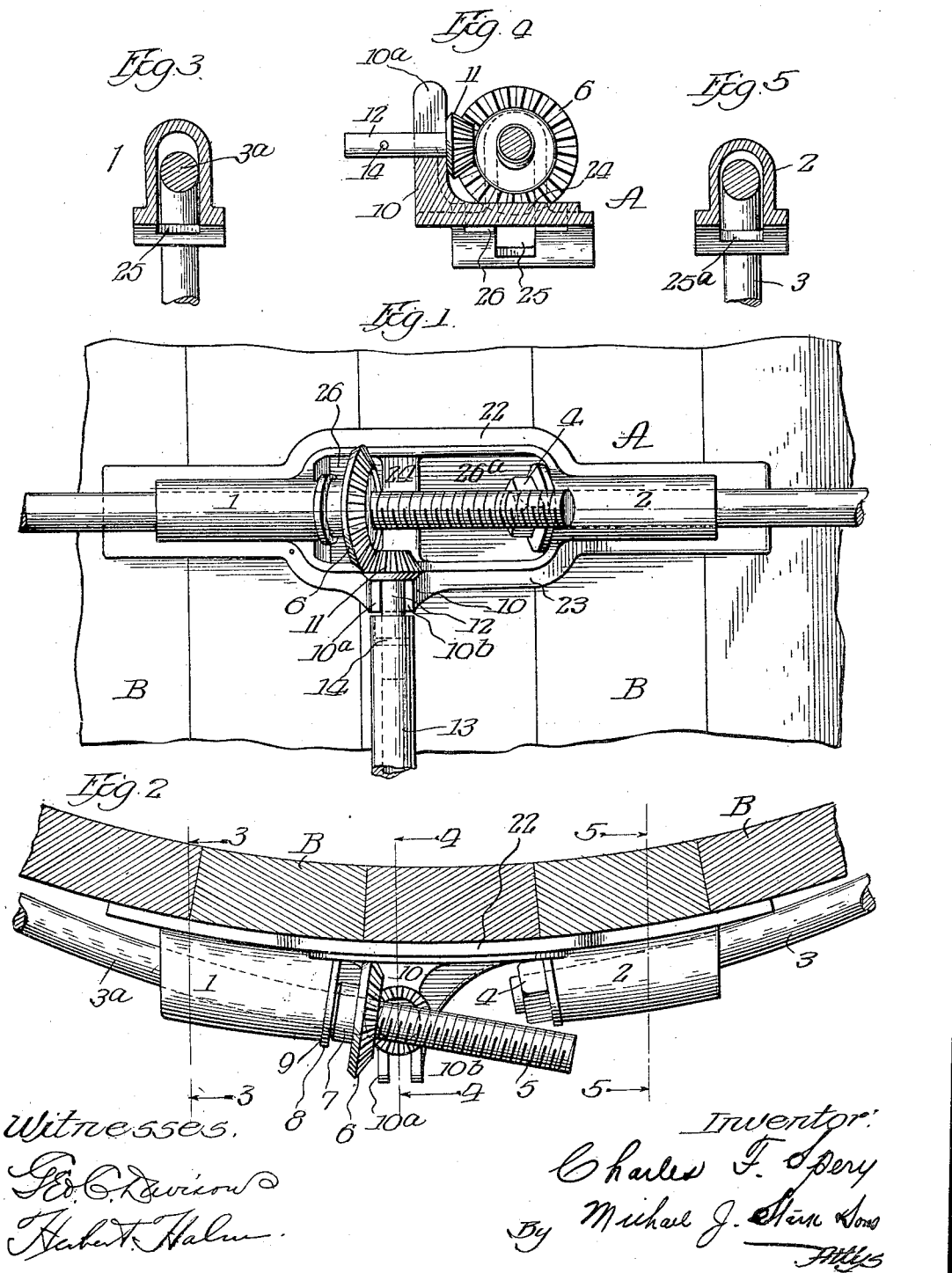

UNITED STATES PATENT OFFICE.

CHARLES F. SPERY, OF CHICAGO, ILLINOIS, ASSIGNOR TO LUGTITE MFG. CO., OF FORRESTON, ILLINOIS, A CORPORATION OF SOUTH DAKOTA.

TIGHTENING MEANS FOR SILOS, TANKS, AND THE LIKE.

1,111,107. Specification of Letters Patent. Patented Sept. 22, 1914.

Application filed May 17, 1913. Serial No. 768,274.

*To all whom it may concern:*

Be it known that I, CHARLES F. SPERY, a citizen of the United States, and a resident of the city of Chicago, in the county of Cook and State of Illinois, have invented a certain new and useful Improvement in Tightening Means for Silos, Tanks, and the like; and I do hereby declare that the following description of my said invention, taken in connection with the accompanying sheets of drawings, forms a full, clear, and exact specification, which will enable others skilled in the art to which it appertains to make and use the same.

My invention relates generally to improvements in tightening means for silos, tanks and the like, and it consists, essentially, in the novel and peculiar combination of parts and details of construction, as hereinafter first fully set forth and described and then pointed out in the claims.

In the drawings already referred to, which serve to illustrate my said invention more fully, Figure 1 represents a side elevation of a fragment of a tank or silo employing my stave tightening means. Fig. 2 is a horizontal section of the tank staves showing my tightener in elevation. Fig. 3 is a cross section of my device in line 3—3 of Fig. 2. Fig. 4 is a similar section in line 4—4 of Fig. 2. Fig. 5 is a like section in line 5—5 of Fig. 2. Fig. 6 is an elevation of my device as produced in sheet metal, and, Fig. 7 a plan thereof. Fig. 8 is a cross section in line 8—8 of Fig. 7. Fig. 9 is a similar section in line 9—9 of Fig. 7. Fig. 10 is a plan view of a detail of construction, and Fig. 11 an elevation of a key devised in connection with my invention.

Like parts are designated by corresponding characters or symbols of reference in all the figures of the drawings.

It is the aim and object of my invention to construct a simple, effective and dependable means for tightening, or, rather, increasing the tension of hoop rods on silos or other large wooden tanks, certain portions of such means remaining constantly in engagement with said tightening rods.

A further object of my invention is the construction of a suitable key consisting of articulated joints, which key is large enough so that the upper end of the same may be dropped into operative engagement with the tightening means on the tank while the operator thereof remains on the ground level to rotate the same.

A, Fig. 1, in the drawings represents an essentially rectangular base frame, having integrally cast therewith upwardly projecting, longitudinally disposed semi-tubular bosses 1 and 2, at either end, through the interior of the last named of which extends one end of a hoop rod 3, said rod being maintained from withdrawal from said boss 2 by a nut 4 on the end thereof.

Boss 1 of base frame A is of higher elevation than boss 2 hereinbefore mentioned and is intended for the reception thereof and passage therethrough of the opposite end $3^a$ of hoop rod 3, so that said end $3^a$ after being passed through boss 1 will pass over boss 2, rod 3, and nut 4, as clearly indicated in Fig. 2 of the drawings, in which view and Fig. 1, B indicates the staves forming the tank or silo. The end $3^a$ is screw threaded as at 5 for a considerable distance from its extreme end for the reception of a bevel gear 6 which is axially, internally screw threaded and provided with a suitable hub 7, which hub bears upon a washer 8 on said rod, which washer, in turn, bears against the inner end 9 of the boss 1. It will thus be observed that rotation of the bevel gear 6 in the proper direction will take up all slack in the rod 3 and finally create sufficient tension therein to maintain the staves B in proper position.

Meshing into bevel gear 6 and supported by a lateral upstanding post 10 of the base frame A is a bevel pinion 11, which pinion is preferably formed with a shank 12, on the back thereof, resting in said post, which is possessed of two upwardly projecting parallel wings $10^a$ and $10^b$, the distance between which is equal the diameter of the shank 12 of pinion 11, plus a slight clearance, so that said pinion may be readily lifted from its seat in post 10 and removed therefrom whenever desired. Over the end of shank 12 of pinion 11 is affixed a piece of standard wrought iron or similar pipe 13 held in position by a pin 14. The opposite or free end of this pipe is formed with a pair of oppositely disposed projecting lugs 15, freely entering recesses 16 of a similar pipe 17, forming a clutch, as it were. Into the adjacent ends of these pipes 13 and 17 is freely fitted a cylindrical plug 18, removably pinioned to pipe 17 by a pin, nail or cotter pin 19 and similarly maintained in pipe 13 by a like pin 20. At the lower end of pipe 17 is formed a squared portion 21 for the application of a suitable wrench, whereby the same may be rotated. Attention is now directed to the fact that there may be several of these pipes 13 and 17 joined together as described, depending entirely upon the height of the tank or silo upon which it is to be used.

When producing the base frame A in cast material such as malleable iron or steel, I cast the semi-tubular bosses 1 and 2 integrally with the base proper, these two parts being connected by longitudinal side arms 22 and 23, on the latter of which is cast the upstanding post 10. Side arms 22 and 23 are further connected together in the space between bosses 1 and 2 by a cross brace 24 for purposes of stiffness. The interior of the bosses 1 and 2 is hollowed out right to the exterior of the base frame as seen at 25 and 25$^a$, Figs. 3 and 5, and these openings are a continuation of openings 26 and 26$^a$ Fig. 1, this construction tending to lightness of construction and ease of production in the process of casting in sand without the use of cores, in a well understood manner.

I may also produce my base frame A entirely from sheet steel or iron, in which case I first punch or shear out a flat, rectangular plate 30 and bend the same to the proper curvature. Then I press into U shape with horizontal outwardly projecting flanges 31 and 31$^a$ and 32 and 32$^a$ the bosses 1 and 2. These I next rivet to the plate 30 near the opposite ends thereof by means of rivets 33 and 34. For the supporting post for the pinion 11, I produce a rectangular blank 35. Near one end thereof I punch four rivet holes 36 and 36$^a$, and near one of the longitudinal edges adjacent one set of said rivet holes a slotted opening 37. Longitudinally of blank 35, I also punch an oblong slot 37$^a$ having rounded ends 38. Then I bend up the blank 35 at right angles along transverse dotted line 39 and then turn over about an arc of a circle the portion of the blank between dotted lines 40 and 40$^a$, thereby producing an upstanding post comprising a base portion 41 and an upstanding part having parallel legs 42 and 42$^a$. The slot 37$^a$ has been so located prior to bending up the parts that it forms an open topped slot 43 for the pinion 11. The base of this blank is now placed transversely of blank 30 directly next to boss 1 with opening 37 adjacent therewith and riveted in place by means of rivets 44. The object of opening 37 is to afford ample clearance for the lower portion of bevel gear 6 in a manner easily understood. The leg 42$^a$ of the post is made longer than 42 by the thickness of the base 30, so that when the same is placed in position, the said leg also resting upon the staves B, a firm support therefor is produced.

When using the last named type of construction I place at the back of pinion 11, on shank 12, a loose washer 50 and a loose roller 51, the over all length of which roller is somewhat in excess to the total length of seating 43, so that said pinion when in place has a long bearing provided for it.

I may now describe the operation of my invention as follows: When a staved tank is first erected the hoop rods 3, and with their base frames, are placed around the same at suitable distances apart and the bevel gears 6 rotated until there is a slight strain in all of the rods; enough to hold the structure together, after which the staves are properly alined and then the rods tightly screwed up by means of pinion 11 and gear 6. Heretofore such tighteners as have been made have been provided with nuts at each end of the hoop rods, so that it became necessary to employ a step ladder and wrench to reach and tighten the higher rods. With my device, however, a man may remain on the ground (jointing or unjointing the articulated pipes 17 and 13 of bevel gear 11 as the case may be,) and, by erecting the articulated pipe-shaft with the bevel pinion 11 at its upper end, permit the shank 12 of said pinion to drop by gravity into the open space in post 10, between the wings 10$^a$ and 10$^b$, after which a slight twist of said pipe-shaft will cause the shank of said pinion to become seated in the seating in said post, and, said pinion itself to become meshed with bevel gear 6. Continued revolution of said articulated pipe-shaft will cause the tightening up of said hoop rods in an evident manner.

Attention is now directed to the fact that no matter how many hoop rods may be located on the tank or silo, only one pinion is employed; that on the end of the pipe-shaft, which pinion functions as a turn or actuating key for the various gears 6. When the particular gear 6 being acted upon has sufficiently tensioned its respective rod, a reverse twist of the pipe-shaft will cause the teeth of pinion 11 to climb, as it were, up on the teeth of the gear 6, thereby disengaging itself therefrom and permitting the pinion and its shank to be lifted from its temporary seating in the post 10. Attention is further drawn to the fact that it is not necessary to employ a bevel pinion and a bevel gear in my device, as a crown or face gear and a mating lantern pinion will serve the same purpose.

While herein I have described the preferred methods of carrying out my invention, I may make changes in details thereon without departing from the sprit or scope thereof.

Having thus fully described my invention,

I claim as new and desire to secure to myself by Letters Patent of the United States:—

1. The combination with a structure, of a plurality of split bands; a connection adjustably connecting the ends of each of said split bands; and a sectional actuating means adapted to operate any one of said adjustable connections independently from a position at the base of said structure, substantially as described.

2. The combination with a structure, of a plurality of split bands; a connection adjustably connecting the ends of each of said split bands; and a manually operative sectional shaft adapted to operate any one of said adjustable connections, said shaft being formed so that one or more sections may be removed and the remaining sections operatively connected, substantially as described.

3. The combination with a structure having a plurality of vertically spaced split bands surrounding the same, of means adjustably connecting the ends of each of said bands, a manually rotatable sectional shaft adapted for coöperation with each of said connecting means for manually operating the latter to vary the distance between the band ends engaged thereby, the sections of said shaft being releasably connected for varying the length of said shaft to accommodate the same for operating any one of said connecting means by an operator stationed at the base of said structure, substantially as described.

4. A tightener of the class described comprising a base frame, a hooped tightener rod, means on said base frame to receive each end of said rod, a toothed gear threaded over one of the ends of said rod and abutting one of said means, a laterally disposed post on said frame, there being an open topped seating in said post, a toothed pinion having a shank fitting said seat and meshing with said gear, and an articulated actuating shaft fixed to said shank, whereby when said shaft is rotated in one direction said rod will be tightened and when rotated in the opposite direction said pinion will be caused to climb the teeth of said gear and become removed from said seating.

5. A tightener of the class described comprising a base frame, upstanding lugs at either end thereof, a hooped tightener rod having its ends passed through said lugs, one of said lugs having a higher elevation than the other, so that that end of said rod will pass over the opposite end thereof when overlapping the same, a toothed gear threaded over the end of higher elevation and abutting against its lug, a laterally disposed post on said frame, there being an open topped seating in said post, a toothed pinion having a shank fitting said seat and meshing with said gear, and an articulated actuating shaft fixed to said shank, whereby when said shaft is rotated in one direction said rod will be tightened and when rotated in the reverse direction said pinion will be caused to climb the teeth of said gear and become removed from said seating.

6. A tightener of the class described comprising a base frame and longitudinally apertured alined lugs thereon, a hooped tightener rod having its free ends passed through said lugs, one of said ends being fixed against removal therefrom, a toothed gear threaded over the other of said ends and abutting against its respective lug, a laterally disposed upstanding post on said base frame adjacent said gear, said post having upwardly extending side wings and a shaft seating therebetween, a toothed pinion with a shank adapted to seat in said seating, said pinion meshing with said gear, and an articulated actuating shaft fixed to said shank, whereby when said shaft is rotated in one direction said gear will be rotated and said hooped rod tightened and when rotated in the reverse direction, said pinion will be caused to climb the teeth of said gear and become removed from said seating.

7. A tightener of the class described comprising a sheet-metallic base plate, a pair of sheet metallic inverted U-shaped lugs fixed at opposite ends thereof, a rectangular sheet metallic plate having a long longitudinal slot therein fixed laterally of said base plate with that portion of said plate containing said slot extending laterally beyond said base, said extending portion being first bent upwardly and then downwardly, whereby said slot forms an open topped shaft seating, a hooped tightener rod having its ends passed through said lugs; one of said ends being fixed against removal, a toothed gear threaded over the other of said ends and abutting against its lug, a toothed pinion removably seated in said seating and meshing with said gear, and an articulated actuating shaft for said pinion.

In testimony whereof I have hereunto set my hand in the presence of two subscribing witnesses.

CHARLES F. SPERY.

In the presence of—

C. S. STARK,
W. O. STARK.

---

Copies of this patent may be obtained for five cents each, by addressing the "Commissioner of Patents, Washington, D. C."